United States Patent [19]
O'Neal et al.

[11] Patent Number: 6,163,452
[45] Date of Patent: Dec. 19, 2000

[54] DISPLAY SCREEN ASSEMBLY APPARATUS AND METHOD

[75] Inventors: Sean P. O'Neal, Round Rock; Reynold Li Liao, Austin, both of Tex.

[73] Assignee: Dell USA, L.P., Round Rock, Tex.

[21] Appl. No.: 09/435,234

[22] Filed: Nov. 5, 1999

[51] Int. Cl.[7] .............................. H05K 5/00; H05K 7/00
[52] U.S. Cl. ....................... 361/681; 361/683; 361/686; 312/223.1
[58] Field of Search .................................. 361/681, 683, 361/686; 312/223.1, 223.2; 346/164; 248/917, 918; 345/169, 905

[56] References Cited

U.S. PATENT DOCUMENTS

| | | | |
|---|---|---|---|
| 5,052,078 | 10/1991 | Hosoi | 16/297 |
| 5,144,290 | 9/1992 | Honda et al. | 340/711 |
| 5,193,069 | 3/1993 | Furuya | 364/708 |
| 5,196,993 | 3/1993 | Herron et al. | 361/393 |
| 5,355,279 | 10/1994 | Lee et al. | 361/681 |
| 5,379,183 | 1/1995 | Okonsky et al. | 361/681 |
| 5,410,447 | 4/1995 | Miyagawa et al. | 361/681 |
| 5,500,982 | 3/1996 | Hosoi | 16/297 |
| 5,566,048 | 10/1996 | Esterberg et al. | 361/681 |
| 5,594,620 | 1/1997 | Register | 361/681 |
| 5,768,096 | 6/1998 | Williams et al. | 361/681 |
| 5,796,579 | 8/1998 | Nakajima et al. | 361/683 |
| 6,006,243 | 12/1999 | Karidis | 708/100 |
| 6,034,869 | 3/2000 | Lin | 361/686 |
| 6,049,454 | 4/2000 | Howell et al. | 361/686 |

OTHER PUBLICATIONS

Pending Patent Application: Bryan Howell, Andrew Moore, "LCD Housing Having Offset Hinges", Dell USA, L.P.

Pending Patent Application: Susie Yeager, Andrew Moore, "Adapter for Various LCD Sizes in a Computer"; Dell USA, L.P.

Pending Patent Application: Rick Wahl, Andrew Moore, "Adjustable Clutch Hinge Assembly for Portable Computer"; Dell USA, L.P.

Pending Patent Application: Bryan Howell, Rick Wahl, Peter Skillman, Otto Deruntz, "LCD Housing Having Vertically Offset Hinges"; Dell USA, L.P.

NEC Z1—Features & Specifications, <http://www.nec-z1.com/features/welcome.html.

Versa M IPB Main Frame, "Versa M Illustrated Parts Breakdown", <http://support.neccsdeast.com/products/Versa/M/ipb/frmain/htm.

*Primary Examiner*—Leo P. Picard
*Assistant Examiner*—Tung Minh Bui
*Attorney, Agent, or Firm*—Baker Botts L.L.P.

[57] ABSTRACT

A display screen assembly apparatus and method are disclosed including a base assembly and a rotatable coupling attached to the base assembly. The rotatable coupling preferrably includes a display screen interface and a first electrical interface conductively connected to the base assembly. A display screen assembly releasably secures to the display screen interface. The display screen assembly has a second electrical interface operable to releasably engage the first electrical interface and conduct electrical signals from the base assembly through the first electrical interface and the second electrical interface to the display screen assembly.

20 Claims, 3 Drawing Sheets

DISPLAY SCREEN ASSEMBLY APPARATUS AND METHOD

TECHNICAL FIELD

The disclosure relates generally to the field of electronic devices and more specifically to a modular display screen apparatus and method.

BACKGROUND

Portable computers such as laptop or notebook computers generally include a base and a display screen assembly which is pivotally connected to the base at a hinged type connection. The display screen assembly typically includes a flexible cable connecting the display screen assembly to the base to allow electrical signals to communicate from the base to the display screen assembly. The display screen assembly often includes one portion of a hinged type connection for mating with another portion of the hinged type connection included with the base. Often, the process of mating the base with the display screen assembly, both aligning the hinged type connection and connecting an associated flexible cable can be problematic. This process often requires specialized tools and expertise that a typical end user does not possess. Disassembling the display screen assembly from the base typically requires similarly specialized tools and expertise.

Accordingly, providing maintenance and repair services related to the display screen assembly often requires the services of a technician who possesses specialized tools and expertise. An end user may experience a number of problems which require that the display screen be removed from the base assembly including: a malfunctioning pixel, a malfunctioning line of pixels, a damaged LCD cable, a cracked liquid crystal display (LCD), a failed LCD latch or hook, a malfunctioning back light, or a malfunctioning inverter. Typically, an end user must seek a technician to make repairs. The technician may disassemble, repair or replace the display screen assembly, then reassemble the computer. This process consumes valuable user time and requires the services of a skilled and often expensive technician. Additionally, the user does not have the use of the computer while its being repaired. The time, effort, complexity and expense involved in the removal and installation of a display screen assembly also does not facilitate upgrading an existing display screen assembly.

The technical difficulties associated with a typical display screen assembly often result in increased manufacturing costs. Complex geometries and the general lack of uniformity of typical display screen assemblies also contribute to higher manufacturing costs. The physical process of attaching a display screen assembly to a base assembly consumes valuable time and resources. Also, the display screen component is often one of the most costly components of a portable computer. Because the display screen must typically be assembled in the display screen assembly prior to being attached to the base assembly, the display screen component must be within a manufacturers inventory throughout this period. Holding this component in the manufacturers inventory also consumes valuable resources.

SUMMARY

In accordance with the teachings of the present disclosure a system and method are disclosed for attaching a display screen assembly to a base. For one embodiment the system includes a base, a rotatable coupling, and a display screen assembly. The rotatable coupling is preferably attached to the base and includes a hinged type connection. The rotatable coupling may also include a first electrical interface which communicates electrical signals with the base. The display screen assembly releasably attaches to the rotatable coupling such that the display screen assembly and the rotatable coupling may attach and detach without requiring specialized tools or expertise. The display screen assembly preferably includes a second electrical interface. When the display screen assembly is releasably attached to the rotatable coupling, the second electrical interface connects with the first electrical interface to communicate electrical signals between the base and the display screen assembly.

More specifically, the display screen interface may include a first mounting arm extending from the rotatable coupling and a second mounting arm extending from the rotatable coupling. The first mounting arm releasably attaches to a first portion of the display screen assembly and the second mounting arm releasably attaches to a second portion of the display screen assembly.

In another aspect of the present disclosure, a display screen assembly is disclosed having a housing and a display screen disposed within the housing. An electrical interface is disposed in the housing and operable to receive electrical signals and conductively connected to the display screen. The display screen assembly preferably includes a mechanical interface for releasably attaching the display screen assembly to a rotatable coupling portion of a portable computer base. More specifically the mechanical interface may comprise a plurality of threaded bores for receiving respective mechanical fasteners. The mechanical fasteners are preferably operable to releasably attach the display screen assembly with the rotatable coupling portion of the portable computer base.

In yet another aspect of the present disclosure a method for attaching a display screen assembly to a computer system includes attaching the rotatable coupling to a portion of the computer system and releasably attaching the display screen assembly to the rotatable coupling. More specifically the present invention includes removing the display screen assembly from the rotatable coupling and releasably attaching a replacement display screen assembly to the rotatable coupling.

The present invention includes a number of important technical advantages. One important technical advantage is providing a display screen assembly releasably secured to the display screen interface. This allows the display screen assembly to be easily removable such that a user may remove the display screen assembly from the rotatable coupling without specialized tools or the assistance of a technician. This also also simplifies the manufacture of the system, reducing assembly time and associated costs including labor and inventory costs. Additionally, repair of the system is simplified, allowing only the necessary replacement parts such as the rotatable coupling or the display screen assembly to be sent for replacement.

Another technical advantage is providing the step of releasably securing a replacement display screen assembly to the rotatable coupling. This method allows for a replacement display screen assembly such as an upgraded display screen assembly to be easily installed onto an existing computer base.

Yet another technical advantage is providing a display screen interface such as a first mounting arm extending from the rotatable coupling and a second mounting arm extending from the rotatable coupling. This display screen interface allows for a display screen assembly to be easily attached to a base assembly.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
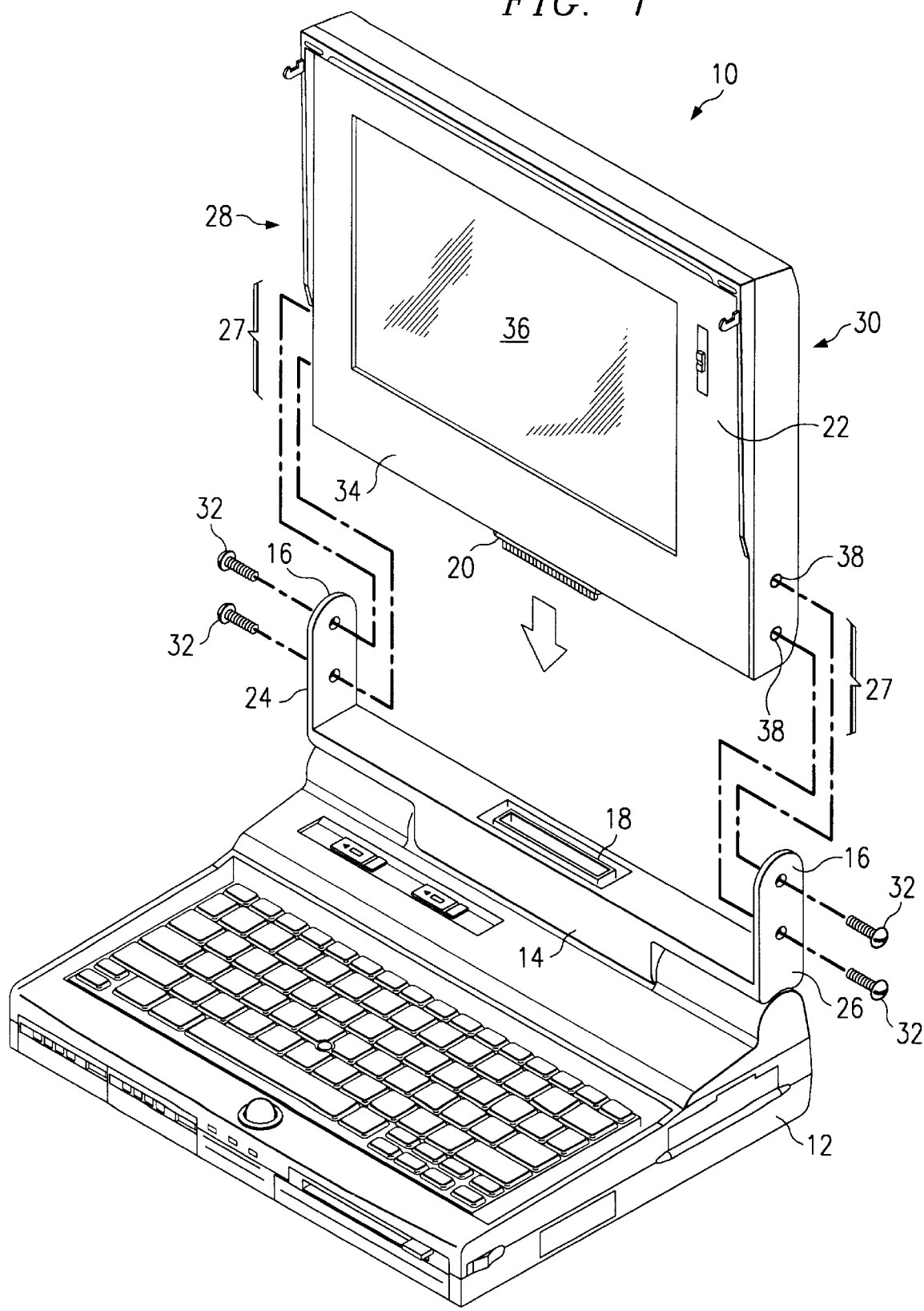
FIG. 1 is a schematic diagram showing an isometric view, with portions broken away, of one embodiment of a computer system including a modular display screen assembly.
Figure 2:
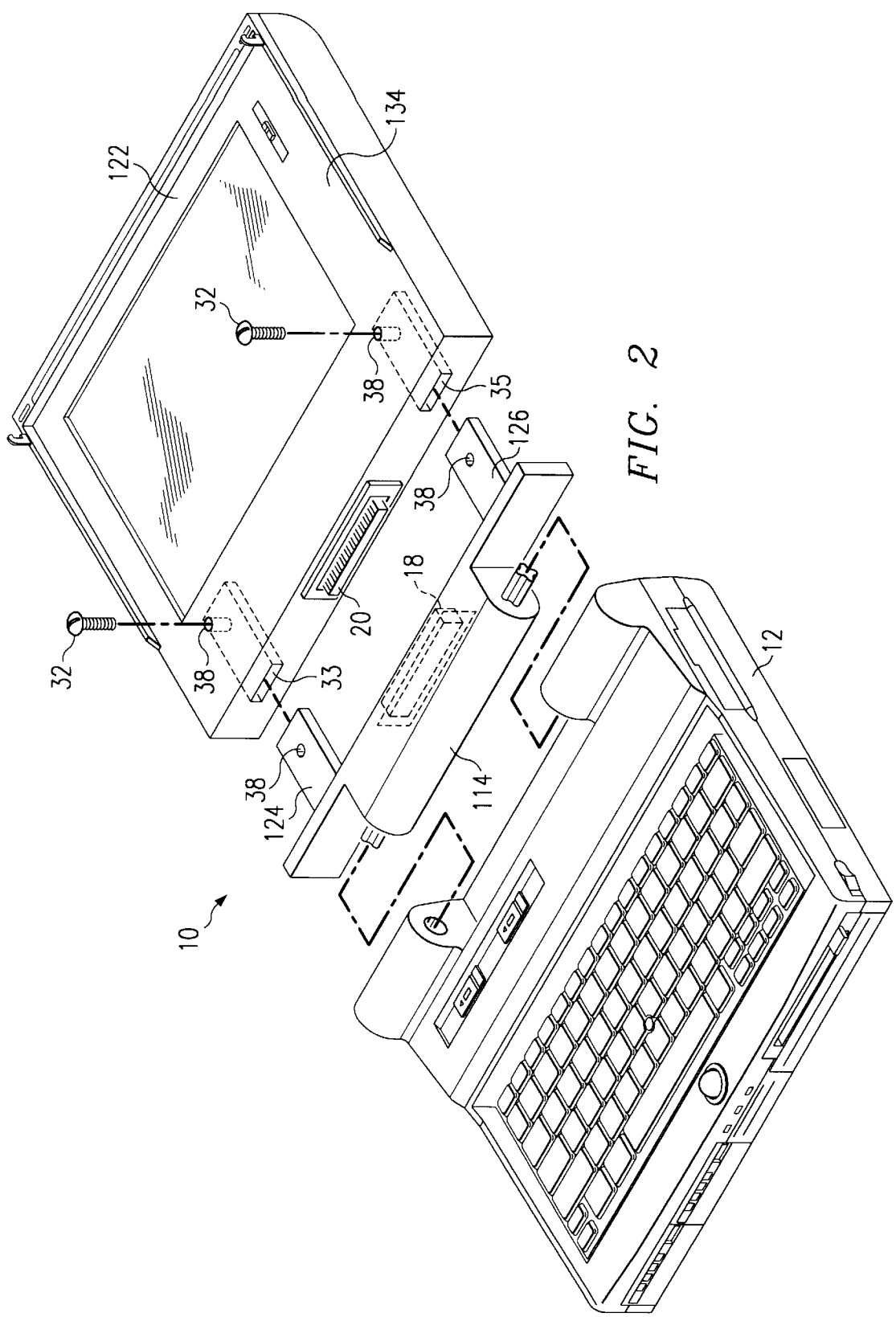
FIG. 2 is a schematic diagram showing one exploded isometric view of a computer system incorporating teachings of the present disclosure including interior sleeves formed within a display screen assembly housing.

Preferred embodiments and their advantages are best understood by reference to FIGS. 1 through 3, wherein like numbers are used to indicate like and corresponding parts.

FIG. 1 is a schematic diagram showing an isometric view with portions broken away of one embodiment of a computer system including a modular display screen assembly. The computer system indicated generally at 10 includes a base assembly 12 and a rotatable coupling 14 which is attached to base assembly 12. Rotatable coupling 14 includes a display screen or mechanical interface 16 and a first electrical interface 18. First electrical interface 18 conductively connects to electrical components (not expressly shown) contained within base assembly 12. A display screen assembly 22 may be releasably attached to display screen interface 16. Display screen assembly 22 comprises a second electrical interface 20 which is operable to connect to first electrical interface 18 and communicate electrical signals between base assembly 12 to display screen assembly 22, through the first electrical interface 18 and second electrical interface 20. Base assembly 12 may comprise a portable computer base assembly or a laptop computer base assembly. Base assembly 12 typically includes components such as a microprocessor, a memory, an input device such as a key board, a disk drive, and input and output connections.

Rotatable coupling 14 is preferably attached to base assembly 12 and may include a hinged type connection. For the embodiment shown in FIGS. 1,2, and 3, base assembly 12 includes rotatable coupling 14 with a hinge portion sized to mate with selected portions of display screen assembly 22. Rotatable coupling 14 also includes a flexible cable which connects first electrical interface 18 to electrical components (not expressly shown) within base assembly 12 such that electrical signals may communicate between electrical components within base assembly 12 and first electrical interface 18.

Rotatable coupling 14 preferably includes a display screen interface 16 having a first mounting arm 24 and a second mounting arm 26 for attaching display screen assembly 22. First mounting arm 24 and second mounting arm 26 both extend from rotatable coupling 14. Display screen assembly 22 preferably includes mechanical interface 27. Mechanical interface 27 includes a first portion 28 for releasably attaching first mounting arm 24 and a second portion 30 for releasably engaging second mounting arm 26. First portion 28 and second portion 30 may include recessed portions in display screen assembly 22. The recessed portions may align with first mounting arm 24 and second mounting arm 26 such that the releasable attachment of the first mounting arm 24 and second mounting arm 26 to mechanical interface 27 forms a substantially smooth exterior surface.

When display assembly 22 is releasably attached to rotatable coupling 14, first electrical interface 18 preferably engages second electrical interface 20 such that first electrical interface 18 automatically aligns with and contacts second electrical interface 20. First electrical interface 18 and second electrical interface 20 may comprise a blind mate connection or another connection or interconnect device suitable for conductively connecting display screen assembly 22 to rotatable coupling 14.

For some applications display screen assembly 22 preferrably includes a housing 34 with a display screen 36 disposed therein. Display screen 36 may comprise a LCD or a suitable flat panel display. Display screen 36 preferraby connects with second electrical interface 20 such that electrical signals communicate between second electrical interface 20 and display screen 36.

Display screen assembly 22 typically includes a back light (not expressly shown) conductively connected to second electrical interface 20 and display screen 36. The back light is generally operable for illuminating display screen 36.

For some applications, mechanical interface portion 27 may include a plurality of threaded bores 38 for releasably attaching a plurality of mechanical fasteners 32. Mechanical fasteners 32 may comprise threaded screws, bolts, or other suitable fasteners. A plurality of threaded bores 38 are preferably formed in first portion 28 and second portion 30 such that fasteners 32 may releasably attach first mounting arm 24 to first portion 28 and second mounting arm 26 to second portion 30. First mounting arm 24 and second mounting arm 26 may include a plurality of bores formed therein or extending therethrough to allow mechanical fasteners 32 to releasably attach first mounting arm 24 to portion 28 and second mounting arm 26 to second portion 30.

In another alternative embodiment display screen interface 16 of rotatable coupling 14 may comprise a single mounting arm extending from rotatable coupling 14 or a plurality of mounting arms operable to releasably attach to interface portion 27. Accordingly, interface portion 27 of display screen assembly 22 may comprise a number of geometries suitable for releasably attaching display screen interface 16. In another alternative embodiment, display screen interface 16 and mechanical interface 27 may releasably attach to one another via an embedded fastening mechanism such as, for example a snap or spring loaded latch mechanism (not expressly shown).

In still another alternative embodiment, display screen interface 16 of rotatable coupling 14 and interface portion 27 of display assembly 22 may be releasably attached by a releasable fastener. The releasable fastener may comprise a screw, bolt, pin, clamp, latch, snap or other suitable releasable fastener. In yet another alternative embodiment, a locking mechanism (not expressly shown) may be included to lock display screen assembly 22 to rotatable coupling 14.

The locking mechanism may comprise a latching mechanism operated by a key, a screw or bolt requiring a special tool for installation or removal, a bore or loop for facilitating the use of a security cable, or another suitable locking mechanism.

FIG. 2 is a schematic diagram showing one exploded isometric view of a computer system incorporating teachings of the present disclosure including interior sleeves 33 and 35 formed within a display screen assembly housing 134. Computer system 10 includes base assembly 12 and rotatable coupling 114. Base assembly 12 connects to rotatable coupling 114. Rotatable coupling 114 includes first electrical interface 18, first mounting arm 124 and second mounting arm 126. Display screen assembly 122 releasably attaches to rotatable coupling 114. Display screen assembly 122 includes second electrical interface 20 and a first interior sleeve 33 and a second interior sleeve 35 formed within display screen assembly 122 for receiving first mounting arm 124 and second mounting arm 126 respectively.

In an alternative embodiment rotatable coupling 114 may include a single mounting arm or a plurality of mounting arms. Display screen assembly 122 may similarly comprise a single interior sleeve or a plurality of interior sleeves for receiving the respective mounting arm or mounting arms extending from rotatable coupling 114. Display screen assembly 122 further includes second electrical interface 20. Second electrical interface 20 is disposed within display screen assembly 122 such that as first mounting arm 124 and second mounting arm 126 releasably engage first interior sleeve 33 and second interior sleeve 35 respectively, second electrical interface 20 aligns with and engages first electrical interface 18.

Plurality of mechanical fasteners 32 releasably attach housing 134 to first mounting arm 124 and second mounting arm 126. Plurality of mechanical fasteners 32 may be inserted into plurality of threaded bores 38 formed in housing 134 and first mounting arm 124 and second mounting arm 126. Plurality of threaded bores 38 align when display screen assembly 122 engages rotatable coupling 114 and when first electrical interface 18 engages electrical interface 20. In an alternative embodiment a number of fasteners may be employed to releasably attach a mounting arm extending from releasable coupling 114 to an interior sleeve formed within housing 134. For example, a snap connector may be disposed with first interior sleeve 33 and second interior sleeve 35. Alternatively, a screw, bolt, pin, or other suitable fastener may be used to releasably attach first interior sleeve 33 to first mounting arm 124 and second interior sleeve 35 to second mounting arm 126.

In another alternative embodiment first interior sleeve 33 and second interior sleeve 35 may extend through housing 134. In yet another alternative embodiment, first interior sleeve 33 and second interior sleeve 35 may comprise a tapered geometry formed to receive a tapered first mounting arm 124 and a tapered second mounting arm 126.

Figure 3A:
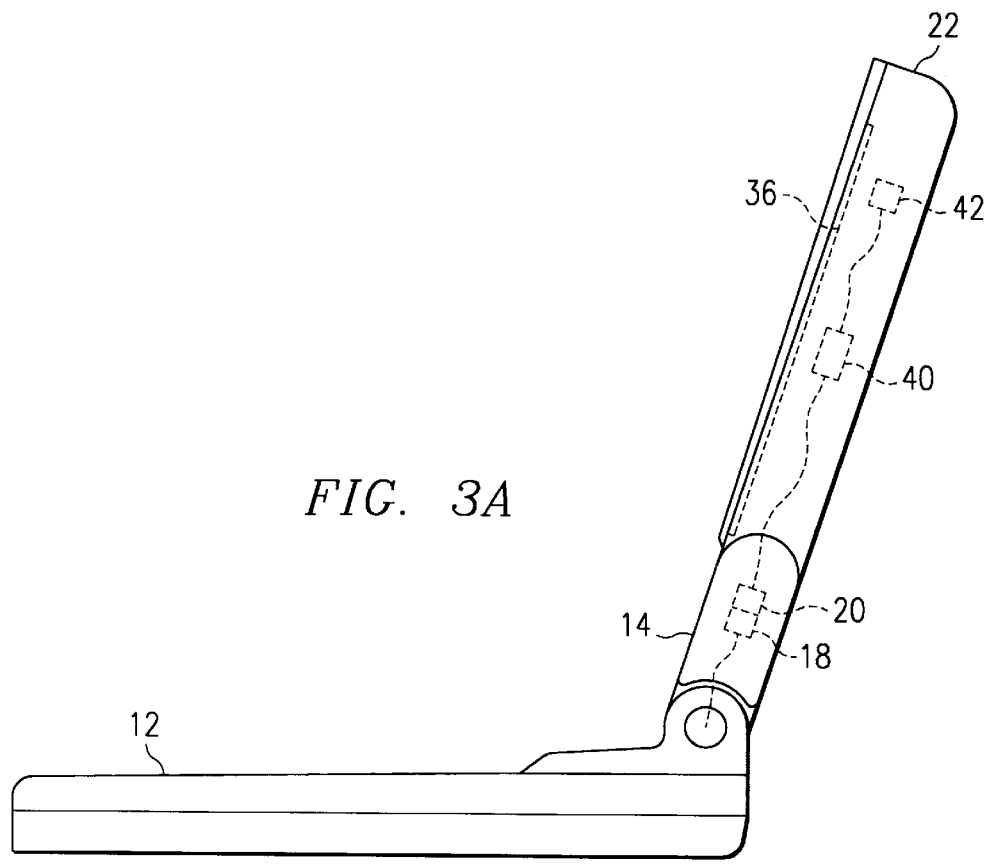
FIG. 3A is a schematic diagram showing a side view according to one embodiment of the present disclosure including an inverter disposed within a display screen assembly.

FIG. 3A is a side view according to one embodiment of the present disclosure including an inverter 40 disposed within display screen assembly 22. System 10 includes base assembly 12 and rotatable coupling 14 attached to base assembly 12. Display screen assembly 22 releasably attaches to rotatable coupling 14. In this embodiment, display screen assembly 22 preferrably includes second electrical interface 20, an inverter 40 and a back light 42. Inverter 40 is in conductive communication with second electrical interface 20. Inverter 40 is further in conductive communication with back light 42.

Figure 3B:
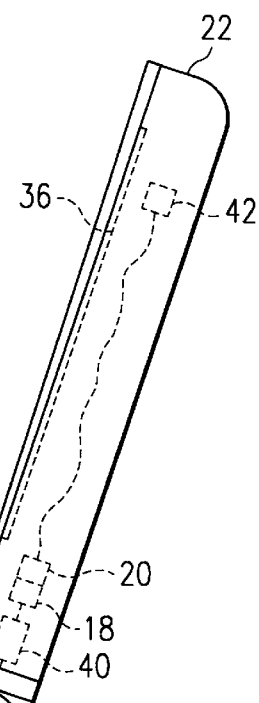
FIG. 3B is a schematic diagram showing a side view of one embodiment of the present disclosure including an inverter disposed within a rotatable coupling.

In an alternative embodiment inverter 40 may be disposed in system 10 separate from display screen assembly 22. FIG. 3B is a side view of an embodiment of the present disclosure including an inverter disposed within rotatable coupling 14. Inverter 40 is in conductive communication with base assembly 12. Inverter 40 is further in conductive communication with first electrical interface 18. Inverter 40 is operable to convert electrical signals from base assembly 12 and send signals through second electrical interface 20 to back light 42.

Although the disclosed embodiments have been described in detail, it should be understood that various changes, substitutions and alterations can be made to the embodiments without departing from their spirit and scope.

What is claimed is:

1. A computer system comprising:

a base assembly;

a rotatable coupling attached to the base assembly, the rotatable coupling having a display screen interface and a first electrical interface;

the first electrical interface conductively connected to the base assembly;

a display screen assembly releasably secured to the display screen interface, the display screen interface sized to couple entirely across a portion of the display screen assembly; and the display screen assembly having a second electrical interface operable to releasably engage the first electrical interface and communicate electrical signals between the base assembly and the display screen assembly through the first electrical interface and the second electrical interface.

2. The computer system of claim 1 wherein the display screen interface comprises at least one mounting arm for interfacing with the display screen assembly.

3. The computer system of claim 1 further comprising a locking mechanism for selectively locking the display screen assembly to the rotatable coupling.

4. The computer system of claim 1 further comprising an inverter disposed in the rotatable coupling, the inverter conductively connected to the first electrical interface, the inverter further conductively connected to the base assembly.

5. The computer system of claim 1 further comprising an inverter disposed in the display screen assembly, the inverter conductively connected to the second electrical interface, the inverter further conductively connected to a display screen.

6. The computer system of claim 2 further comprising the first electrical interface and the second electrical interface formed such that the first electrical interface automatically aligns with the second electrical interface.

7. The computer system of claim 2 wherein the at least one mounting arm further comprises a first mounting arm extending from the rotatable coupling and a second mounting arm extending from the rotatable coupling.

8. The computer system of claim 7 wherein:

the first mounting arm releasably attaches to a first portion of the display screen assembly; and the second mounting arm releasably attaches to a second portion of the display screen assembly.

9. The computer system of claim 6 wherein the display screen assembly further comprises at least one sleeve formed within the display screen assembly for receiving the at least one mounting arm.

10. The computer system of claim 8 further comprising:

a plurality of releasable fasteners attaching the first mounting arm to the first portion of the display screen; and a plurality of releasable fasteners attaching the second mounting arm to the second portion of the display screen.

11. The computer system of claim 9 wherein the at least one mounting arm releasably engages the at least one interior sleeve such that the second electrical interface aligns with and engages the first electrical interface.

12. A display screen assembly comprising:

a housing;

a display screen disposed in the housing;

an electrical interface disposed in the housing operable for receiving electrical signals;

the electrical interface further conductively connected to the display screen; and an interface for releasably engaging the display screen assembly with a rotatable coupling portion of a portable computer base, the interface sized to couple entirely across a portion of the display screen assembly.

13. The display screen assembly of claim 12 wherein:

the interface further comprises a plurality of bores for receiving a plurality of fasteners; and the fasteners operable to releasably attach the housing to the rotatable coupling portion of the portable computer base.

14. The display screen assembly of claim 12 wherein the interface portion further comprises:

at least one sleeve formed within the housing;

the at least one sleeve operable to releasably attach at least one mounting arm extending from the rotatable coupling of the portable computer base.

15. The display screen assembly of claim 12 further comprising:

an inverter disposed in the housing; and the inverter conductively connected to both the electrical interface and the display screen.

16. The display screen assembly of claim 13 wherein the plurality of bores further comprises a plurality of threaded bores for receiving respective threaded fasteners.

17. A method for attaching a display screen assembly to a computer system comprising:

attaching a rotatable coupling to a portion of the computer system; and releasably securing the display screen assembly to the rotatable coupling, the rotatable coupling sized to couple entirely across a portion of the display screen assembly.

18. The method of claim 17 further comprising:

removing the display screen assembly from the rotatable coupling; and releasably securing a replacement display screen assembly to the rotatable coupling.

19. The method of claim 18 wherein releasably attaching the display screen further comprises:

aligning the display screen assembly with at least one mounting arm extending from the rotatable coupling; and releasably securing the display screen assembly to the at least one mounting arm extending from the rotatable coupling.

20. The method of claim 18 wherein releasably attaching a display screen further comprises:

aligning at least one mounting arm extending from the rotatable coupling with at least one sleeve formed within the display screen assembly; and releasably securing the at least one mounting arm to the at least one sleeve.

* * * * *